(No Model.)

J. A. S. GREGG.
GALVANIC BATTERY.

No. 507,708.   Patented Oct. 31, 1893.

Witnesses:
Chas. L. Horack
L. L. Boykin

Inventor:
James A. S. Gregg

UNITED STATES PATENT OFFICE.

JAMES A. S. GREGG, OF NEW ROCHELLE, NEW YORK.

GALVANIC BATTERY.

SPECIFICATION forming part of Letters Patent No. 507,708, dated October 31, 1893.

Application filed April 3, 1890. Renewed December 14, 1892. Serial No. 455,173. (No model.)

*To all whom it may concern:*

Be it known that I, JAMES A. S. GREGG, a citizen of the United States, residing at New Rochelle, in the county of Westchester and State of New York, have invented certain new and useful Improvements in Voltaic or Primary Batteries, of which the following is a full, clear, and exact description.

Heretofore the usual method of manipulating the electrolytes used in voltaic or primary batteries has been to pour the solution into the cells by hand, or to supply the same from a reservoir by means of a faucet, pipe, or siphon operated or regulated by hand, and when the electrolyte was considered exhausted, to get rid thereof, either by pouring it out (which necessitated dismounting the battery or cell) or by drawing it off by means of a syringe, pump, faucet, or siphon, or by simply adding fresh fluid and allowing the exhausted electrolyte to flow away through an aperture or pipe provided for the purpose.

My invention supplies an automatic system for the renovation and discharge of the electrolyte according to the requirements of the work being done by the battery or cell.

It is well known that the specific gravity of most, if not all, electrolytes used in voltaic or primary batteries, alters as electrolytic decomposition takes place, and my invention is to be used principally in connection with electrolytes the specific gravity of which decreases as the process of electrolysis progresses.

The principal objects of my invention are: first, to render the supply and discharge of the electrolyte automatic; second, to do away with the necessity of frequently dismounting the battery or cell; third, to provide against the waste of unexhausted solution; fourth, to aid in keeping the electro-motive force and current, constant or nearly so; fifth, to provide a system whereby one or more cells of a battery may be used independently of the rest, the electrolytes in all being nevertheless retained at or about a certain uniform strength; sixth, to further depolarization by the addition of fresh solution and by the agitation of the electrolyte consequent upon the addition of same; seventh, to provide a simple means of gaging the amount of solution used under any given circumstances. I attain these objects by the use of an appparatus as illustrated in the accompanying drawings, in which—

Figure 1:
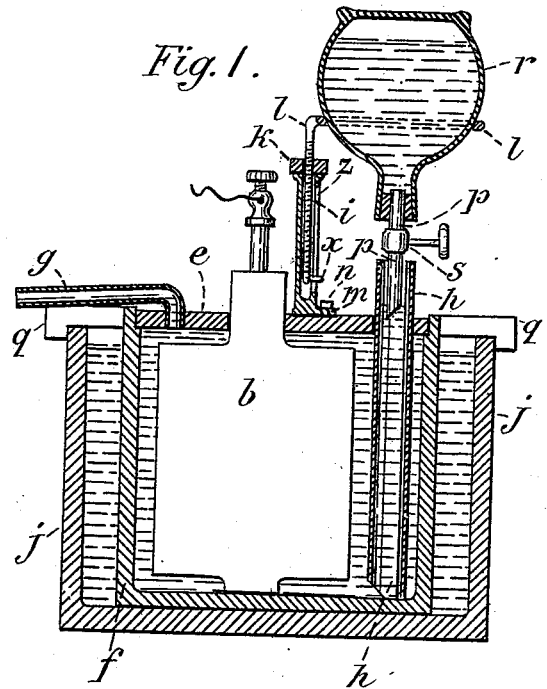
Figure 2:
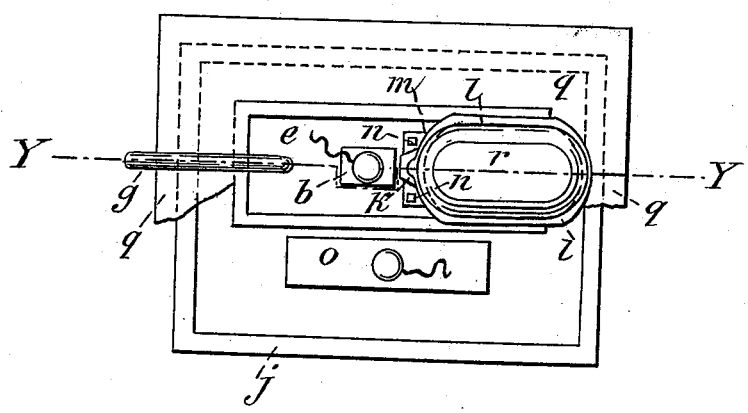

Figure 1 represents a vertical section of the same along line Y Y in Fig. 2, which represents a ground plan.

Similar letters refer to similar parts in both views.

$f$ is a cell made of porous material; within said cell is placed the negative electrode $b$. The cover $e$ of such cell may be made of wood baked in melted paraffine or of any other suitable substance. Such cover contains an aperture through which the negative electrode $b$ may be made to extend upward as shown, an aperature through which passes a conduit pipe $h$ supplying strong electrolytic liquid to the cell, and an aperture into which is inserted an overflow pipe $g$.

The conduit $h$ is a tube preferably of glass and long enough to reach from the bottom of the cell, to about a couple of inches above the top, and having its lower end serrated or cut off at an angle so that fluids delivered into it, may have free egress from it, while it rests on the bottom of the cell.

The overflow pipe $g$ is a tube of glass or any other suitable material, which when fixed in its proper position in the cell cover, has one end flush with the under side of the cover from which point it curves upward and outward over the end of the cells. I have found in practice that it is best to place the highest part of the pipe $g$ at least an inch lower than the top of the conduit $h$.

The upper extension of electrode $b$, the overflow pipe $g$ and the conduit $h$ should preferably be hermetically sealed to the cover $e$ and such cover to the cell $f$ by means of paraffine wax or other suitable material.

$r$ is a reservoir or flask preferably of glass having a short neck fitted with a soft rubber stopper $w$ carrying a pipe $p$ furnished with a stop-cock $s$. The outer end of this pipe $p$ is preferably cut off at an angle as shown in the drawings.

The reservoir holder consists of a hollow metal pillar $i$ having a longitudinal slot $z$ and is attached to a base plate $m$ provided with screws $n$ $n$ for the purpose of fastening it in position on the cell cover, or other convenient place, a bracket $l$ consisting of a metal ring or loop encircling reservoir *r* and having a straight stem (at right angles with the plane of the loop) which stem fits loosely into the bore of the pillar *i* and is threaded to carry the nut *k* which bears upon the top of the pillar, supporting and regulating the elevation of said bracket and with it of said reservoir *r* and of the discharge end of pipe *p*. Near the end of the bracket stem is fixed a short pin *x* which projects through the slot *z* in the pillar *i* preventing the bracket from turning round while leaving it free to move up and down in the pillar when the nut *k* is turned.

*j* is an outer cell surrounding and containing porous cell *f* as well as the second electrolyte and the positive or generating electrode *o*.

*q* is a cover extending over that part of cell *j* surrounding cell *f*. Such cover had preferably be constructed in sections as shown. After hermetically sealing up cell *f* with the exception of the openings through the conduit *h* and overflow pipe *g* said cell may be charged by pouring solution into it through conduit *h* until the cell is full, the carbon or other negative electrode is saturated and the solution begins to escape through the overflow pipe *g*. This solution in conduit *h* and overflow pipe *g* must of course seek the same level, the height depending on the shape and position of the overflow pipe. The cell *j* having likewise been charged with a proper electrolyte, the reservoir *r* is filled with solution corresponding with that in the porous cell *f*, the stop-cock is closed and the reservoir *r* inverted and placed in the holder with the end of the pipe *p* immersed in and closed by the solution in conduit *h*. The nut *k* may then be turned so as to raise or lower the reservoir and by this means to regulate the depth to which pipe *p* is immersed in the solution. Ordinarily the solution should only just close the mouth of pipe *p*. This having been adjusted and the conductors attached to the positive and negative poles the stop-cock *s* is again opened and the apparatus is thereby put in proper working condition.

When the circuit is closed and the current generated the process of electrolytic decomposition which ensues gradually reduces the specific gravity of the electrolyte within cell *f* through which the current passes. The solution in conduit *h* however being insulated is unaffected and so retains its original specific gravity. It therefore sinks within the conduit *h* as the process of electrolysis proceeds, a portion of it escaping at the bottom and mixing with the electrolyte in cell *f* thus displacing a certain quantity of the exhausted liquid, the lightest and most deteriorated part of which being at the surface is then forced out through overflow pipe *g* and may be caught in a receptacle placed underneath its outlet. It is evident that as soon as the solution within conduit *h* sinks low enough to open the mouth of pipe *p* atmospheric air is admitted through it to the reservoir *r* allowing fresh solution to descend into conduit *h* until it rises high enough again to close the mouth of pipe *p*. This operation of supply and discharge is then repeated at intervals varying with the amount of work being done by the battery or cell so long as the circuit continues closed and any solution remains in the reservoir *r*. By immersing the end of pipe *p* to a greater or less depth in the solution contained in conduit *h* the period at which the process of supply and discharge commences can in the one case be retarded and in the other accelerated at pleasure. Where it is retarded the efficiency of battery or cell as a matter of course falls off correspondingly. A material advantage is gained by cutting off the lower end of pipe *p* slanting or placing it within the liquid in pipe *h* so as to have its end assume a position at an angle to a horizontal plane, as in such case when the liquid sinks sufficiently in pipe *h* so as to admit air through pipe *p* to reservoir *r* the whole cross-section of pipe *p* near its lower end will not become available for the upward passage of the air at once, air only being able to enter it at that point of the end section nearest to the surrounding atmosphere; hence such air will only pass upward in small bubbles thus making the discharge from reservoir *r* to cell *f* very gradual and without causing the separation of the two columns of liquid in pipes *p* and *h*.

Under the above described arrangement the space left between the outside of pipe *p* and the inside of tube *h* will enable the person in charge of the apparatus to observe at all times from above the lower end of pipe *p* and the passage into and through the same of the small air bubbles which are intended to pass into reservoir *r*, and to clean and free from obstruction such lower end of pipe *p* whenever this becomes necessary. Such space will also at all times permit of direct and free access of the surrounding atmosphere to the lower end of pipe *p* when the liquid sinks in pipe *h* as mentioned above.

If preferred the hermetically sealed cover of cell *f* may be dispensed with and a loosely fitting cover placed on the cell for the purpose of holding the various parts of the apparatus in place. This would call for only slight modifications in the details of the apparatus which will suggest themselves.

In the following claims the term "voltaic battery" is intended to refer in general to an electric source consisting of a voltaic couple and suitable electrolytic liquid.

It will be seen that where the end of pipe *p* is cut off slanting such pipe is made to perform the function not only of a discharge pipe for reservoir *r* but also that of an independent pipe with a minute inlet admitting air to such reservoir which would otherwise have to be employed in order to procure the gradual discharge of liquid from such reservoir. By providing a support for reservoir *r* independent of the cell of the battery so as to be able to raise or lower such support without affecting the elevation of such cell or its cover I not only provide a simple means of regulating the impoverishment of the liquid within the cell as described, but I also facilitate the substitution of a filled reservoir $r$ for an empty one without disorganizing the structure of the battery and I make it possible to place the cock $s$ in such a position as to be able to operate it by hand whenever desired and particularly to open it by hand when a filled reservoir $r$ has been placed on bracket $l$.

Owing to the great variety of the shapes and sizes of the batteries and cells constantly employed I cannot confine myself to the particular form or arrangement of the apparatus hereinbefore described and illustrated in the accompanying drawings.

As in the outer cell $j$ containing the positive electrode $o$ the electrolyte generally used will not deteriorate rapidly but may in most cases be kept in proper condition for an extended period by adding to it from time to time water, an apparatus for automatically regulating the strength of such electrolyte does not appear required.

I claim as new and desire to secure by Letters Patent—

1. In a voltaic battery, the combination of a cell, an electrode within such cell, an inlet conduit to and an outlet conduit from the same, an independent reservoir for electrolytic liquid, a discharge pipe from the same extending into said inlet conduit, and a valve for closing the discharge from said reservoir placed above the upper end of said inlet conduit, substantially as set forth.

2. In a voltaic battery, the combination of a cell, an electrode within such cell, an inlet conduit to and an outlet conduit from the same, an independent reservoir for electrolytic liquid, and a discharge pipe detachably connected therewith and extending into said inlet conduit the upper end of the inlet conduit being placed lower than said reservoir, substantially as set forth.

3. In a voltaic battery, the combination of a cell, an electrode within such cell, an inlet conduit to and an outlet conduit from the same, an independent reservoir for electrolytic liquid communicating with said inlet conduit, a frame supporting such reservoir, and means for adjusting its elevation with reference to that of the cell, substantially as set forth.

4. In a voltaic battery, the combination of a cell, an electrode within such cell, an inlet conduit to and outlet conduit from the same, an independent reservoir a removable stopper closing its outlet, a tube passing through the stopper and communicating with the inlet conduit, and a cock within such tube, substantially as set forth.

5. In a voltaic battery, the combination of a cell, an electrode within such cell, an inlet conduit to and an outlet conduit from the same, an independent reservoir for electrolytic liquid communicating with the inlet conduit, and means for adjusting the relative elevations of the effective outlets from such reservoir and from such cell, substantially as set forth.

6. In a voltaic battery, the combination of a cell provided with an inlet conduit and an outlet conduit, a partition between said inlet and said outlet extending from the top of the cell down toward its bottom, an electrode placed in the compartment of the cell having the outlet conduit, a reservoir for electrolytic liquid communicating with said inlet conduit, a pipe for admitting air to such reservoir, the air inlet being placed within said inlet conduit and under an angle with a horizontal plane, and means for adjusting the elevation of said air inlet with reference to the elevation of the effective outlet from the cell, substantially as set forth.

7. In a voltaic battery, the combination of a cell provided with an inlet conduit and an outlet conduit, a partition between said conduits extending from the top of the cell down toward its bottom, an electrode in the compartment of the cell having the outlet conduit, a reservoir for electrolytic liquid communicating with the inlet conduit, an air inlet to said reservoir placed within the inlet conduit to the cell, and means for adjusting the elevation of said air inlet with reference to the elevation of the effective section of the outlet conduit, substantially as set forth.

8. In a voltaic battery, the combination of a cell closed hermetically except as to an inlet passage to and an outlet passage from the same, and a reservoir for electrolytic liquid placed above the cell and having its discharge pipe inserted in said inlet passage, the outlet passage being made to lead out of the cover of the cell, substantially as set forth.

9. In a voltaic battery, in combination with cell $f$, inlet passage $h$, outlet passage $g$, electrode $b$, reservoir $r$ communicating with said inlet passage, tube $p$ containing cock $s$ forming such communication and adjustable bracket $l$ supporting the reservoir, substantially as set forth.

JAMES A. S. GREGG.

Witnesses:
WM. E. COOK,
WANHOPE LYNN.